United States Patent
Nada et al.

(10) Patent No.: US 8,428,850 B2
(45) Date of Patent: Apr. 23, 2013

(54) FUEL INJECTION CONTROL APPARATUS OF INTERNAL COMBUSTION ENGINE

(75) Inventors: Mitsuhiro Nada, Toyota (JP); Akio Matsunaga, Miyoshi (JP); Yasuyuki Terada, Toyota (JP); Makio Tsuchiyama, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 484 days.

(21) Appl. No.: 12/746,426

(22) PCT Filed: Oct. 31, 2008

(86) PCT No.: PCT/JP2008/003136
§ 371 (c)(1),
(2), (4) Date: Aug. 20, 2010

(87) PCT Pub. No.: WO2009/072235
PCT Pub. Date: Jun. 11, 2009

(65) Prior Publication Data
US 2010/0312454 A1    Dec. 9, 2010

(30) Foreign Application Priority Data
Dec. 7, 2007 (JP) .................... 2007-316992

(51) Int. Cl.
*F02B 3/00* (2006.01)
(52) U.S. Cl.
USPC .......................... 701/104; 123/299

(58) Field of Classification Search .......... 701/103–105; 123/299–300
See application file for complete search history.

(56) References Cited

U.S. PATENT DOCUMENTS

| 6,659,068 B2 * | 12/2003 | Urushihara et al. .......... 123/295 |
| 2004/0149272 A1 | 8/2004 | Kurtz et al. |
| 2011/0180039 A1 * | 7/2011 | Nada .............................. 123/445 |
| 2012/0253640 A1 * | 10/2012 | Nada .............................. 701/103 |

FOREIGN PATENT DOCUMENTS

| EP | 1 445 462 A2 | 8/2004 |
| EP | 1 564 395 A2 | 8/2005 |
| GB | 2 316 194 A | 2/1998 |
| JP | 11-148409 | 6/1999 |
| JP | 2001-254645 A | 9/2001 |
| JP | 2002-155791 A | 5/2002 |
| WO | WO 99/61771 A1 | 12/1999 |
| WO | WO 03/095818 A1 | 11/2003 |

* cited by examiner

*Primary Examiner* — Hai Huynh
(74) *Attorney, Agent, or Firm* — Kenyon & Kenyon LLP

(57) ABSTRACT

In one embodiment, a total fuel injection amount is calculated from a torque required by an engine. A division ratio of a pre-injection amount that achieves both suppression of ignition delay of fuel from a main injection and suppression of a peak value of a heat production ratio of combustion from the main injection is calculated. Upper and lower limit guards are given to the obtained divided amount, and the divided injection amount is calculated. The injection amount of the main injection is obtained by subtracting the divided injection amount from the total fuel injection amount.

7 Claims, 8 Drawing Sheets

US 8,428,850 B2

FUEL INJECTION CONTROL APPARATUS OF INTERNAL COMBUSTION ENGINE

This is a 371 national phase application of PCT/JP2008/003136 filed 31 Oct. 2008, which claims priority to Japanese Patent Application No. 2007-316992 filed 07 Dec. 2007, the contents of which are incorporated herein by reference.

FIELD OF THE INVENTION

The present invention relates to a fuel injection control apparatus of an internal combustion engine represented by a diesel engine. More specifically, the present invention relates to improvement of a division technique when performing injection by dividing an injected amount of fuel that contributes to torque production of the internal combustion engine.

BACKGROUND OF THE INVENTION

As is conventionally known, in a diesel engine used as an automobile engine or the like, fuel injection control is performed that adjusts a fuel injection timing and a fuel injection amount from a fuel injection valve (also referred to below as an injector) according to an operating state, such as the engine revolutions, amount of accelerator operation, coolant temperature, and intake air temperature (see below Patent Citations 1 and 2).

Incidentally, diesel engine combustion is composed of premixed combustion and diffusive combustion. When fuel injection from a fuel injection valve begins, first a combustible mixture is produced by vaporization and diffusion of fuel (ignition delay period). Next, this combustible mixture self-ignites at about the same time at numerous places in a combustion chamber, and combustion rapidly progresses (premixed combustion). Further, fuel injection into the combustion chamber is continued, so that combustion is continuously performed (diffusive combustion). Afterward, unburned fuel exists even after fuel injection has ended, so heat continues to be generated for some period of time (afterburning period).

Also, in a diesel engine, as the ignition delay period grows longer, or as the vaporization of fuel during the ignition delay period grows more intense, a flame propagation speed after ignition will increase. When this flame propagation speed is large, the amount of fuel that burns at once becomes too great, pressure inside the cylinder drastically increases, and so vibration or noise occurs. Such a phenomenon is called diesel knocking, and often occurs particularly when operating with a low load. Also, in this sort of situation, a drastic elevation in burn temperature is accompanied by an increase in the amount of nitrogen oxide (referred to below as "NOx") produced, and thus exhaust emissions become worse.

Consequently, various fuel injection control apparatuses have been developed in order to prevent this sort of diesel knocking and reduce the amount of NOx that is produced. For example, ordinarily fuel injection from a fuel injection valve is intermittently performed by dividing this injection into a plurality of instances.

Also, Patent Citation 1 discloses performing, as pilot injection in which fuel injection is performed prior to main injection, pilot injection for forming a premix gas in a cylinder, and pilot injection for forming an ignition source for igniting and burning fuel from main injection.

Furthermore, Patent Citation 2 discloses executing main injection by dividing main injection into a plurality of instances, and when the internal combustion engine is under a high load, delaying a start timing of injection of a later stage such that combustion from main injection is interrupted, thus suppressing the production of smoke.

Patent Citation 1: JP 2001-254645A
Patent Citation 2: JP 2002-155791A

SUMMARY OF THE INVENTION

Technical Problem

Incidentally, with conventional fuel injection control in diesel engines, various control parameters (such as fuel injection amount and fuel injection timing) are individually set from the viewpoint of insuring reduced combustion noise, reduced amounts of NOx production, and high engine torque, and in practice, settings are adapted to each type of engine through trial and error (constructing a fuel injection pattern that is suitable for each type of engine).

Therefore, for example, when fuel injection control is performed with priority given to reduced combustion noise and reduced amounts of NOx production, there is a possibility that combustion efficiency will worsen and so it will be impossible to obtain adequate engine torque, and conversely, when fuel injection control is performed with priority given to insuring high engine torque, there is a possibility that this will lead to increased combustion noise and increased amounts of NOx production. In order to both reduce combustion noise and amounts of NOx production and also insure high torque, conventionally, as described above, because the fuel injection pattern is determined through trial and error, a systematic fuel injection control technique common to various engines has not been constructed, so there is still some room for improvement in order to achieve optimization of fuel injection control.

More specifically, fuel ignition delay in diesel engines includes both physical delay and chemical delay. Physical delay is the time needed for vaporizing and mixing of fuel droplets, and is affected by the gas temperature at the combustion location. On the other hand, chemical delay is the time needed for chemical bonding/breakdown of fuel vapor, and oxidation/heat production. Due to the characteristics of the fuel injection valve, fuel injection from the fuel injection valve is locally concentrated, so the ignition delay increases in proportion to an increase in the fuel injection amount.

When the injection delay becomes large, as described above, the amount of fuel that simultaneously burns increases, and due to a sudden increase in the pressure and temperature in the combustion chamber, combustion noise increases, and the amount of NOx produced also increases. Also, in such a condition, the timing of fuel ignition is unstable, so it becomes difficult to match this ignition timing to a target ignition timing.

In order to avoid such a condition, a technique of multi-stage divided injection of fuel is used. Example parameters of this multi-stage divided injection include the number of instances of injection, total fuel injection amount, injection timing, and the interval between injection instances.

In conventional fuel injection control, a physical law that unifies these parameters has not been constructed, so fuel injection parameters are merely determined based on changes in exhaust emissions, engine torque, or the like. In other words, in conventional fuel injection control, because there are many adaptation parameter factors, and thus many different combinations of those factors, the fuel injection pattern is determined through trial and error, without achieving unification of the adaptation process.

Also note that in the technical ideas in each of the above Patent Citations, no consideration is given to systemization of a fuel injection control technique that is common to various engines; merely simple division of the number of instances of fuel injection and adjustment of the injection amount are performed.

It is an object of the invention to provide, for an internal combustion engine that is capable of performing divided injection of fuel, a fuel injection control technique that has been systematized.

Technical Solution

The present invention provides a fuel injection control apparatus of a compression self-igniting internal combustion engine that, with a fuel injection valve, is capable of performing injection by dividing an amount of fuel injected in order to contribute to torque production of the internal combustion engine between a main injection and a sub injection that is performed prior to the main injection, the fuel injection control apparatus comprising: a total fuel injection amount calculation portion that calculates a total fuel injection amount that contributes to torque production based on the torque required by the internal combustion engine; a divided injection amount calculation portion that obtains, as a divided injection amount that is divided from the total fuel injection amount, an injection amount when executing the sub injection that prevents a heat production amount (the balance of the amount of heat absorbed by injected fuel (negative heat amount) and the amount of heat produced by combustion of fuel (positive heat amount)) in initial injection of the main injection from decreasing to a threshold value or less, and suppresses a peak value of a heat production ratio that accompanies combustion of fuel injected the in main injection to less than a predetermined value; an upper/lower limit limiting portion that gives a limit at predetermined upper and lower limit values to the divided injection amount obtained with the divided injection amount calculation portion; and a sub injection timing setting portion that sets an injection timing in execution of the sub injection of the divided injection amount obtained by giving a limit with the upper/lower limit limiting portion.

Here, an injection amount when executing the sub injection such that the amount of heat production (balance of heat) in the initial injection period of the main injection (for example, a predetermined period from the injection start of main injection: e.g., 5 degrees CA in terms of crank angle) is not reduced to a threshold value or less is an injection amount such that in the initial period, in the heat balance between the amount of heat absorbed by an endothermic reaction of fuel injected in main injection and the amount of heat produced by ignition and combustion of this fuel, the amount of heat produced is greater than the amount of heat absorbed. Also, the injection amount when executing the sub injection that suppresses the peak value of the heat production ratio of heat production that accompanies combustion of fuel that has been injected in the main injection to less than a threshold value is an injection amount whereby it is possible to adequately reduce combustion noise and the amount of NOx produced when the fuel injected in main injection is burned.

With this specific configuration, as the injection amount that is injected from the fuel injection valve in the sub injection, a divided injection amount is obtained such that the amount of heat production in the initial injection period of the main injection is not reduced to less than a threshold value, and such that the peak value of the heat production ratio of heat production that accompanies combustion of the fuel that has been injected in the main injection is suppressed to less than a threshold value, and by executing this sub injection prior to the main injection, it is possible to achieve a reduction in the combustion noise and the amount of NOx produced even while adequately insuring the torque of the internal combustion engine.

The following can be cited as a specific example of an operation to calculate a divided injection amount by the divided injection amount calculation portion. That is, the divided injection amount calculation portion obtains a heat production amount-insuring injection amount that is the necessary injection amount when executing the sub injection in order to prevent the heat production amount from decreasing to a threshold value or less in the initial injection period of main injection, and obtains a peak value suppression division ratio that is a division ratio of a divided injection amount relative to the total fuel injection amount required in order to suppress the peak value of the amount of heat production that accompanies combustion of fuel injected in main injection to less than a threshold value, and when the heat production amount-insuring injection amount is more than a peak value suppression injection amount obtained by multiplying the peak value suppression division ratio by the total fuel injection amount, the heat production amount-insuring injection amount is set as the divided injection amount, and when the peak value suppression injection amount is more than the heat production amount-insuring injection amount, the peak value suppression injection amount is set as the divided injection amount.

In this case, the peak value suppression division ratio is set to about 10%, for example.

In order to suppress the endothermic reaction (which is the cause of ignition delay) in the initial injection in the main injection, so that at this time the amount of heat produced is greater than the amount of heat absorbed, it is necessary to reduce the amount of heat absorbed in the endothermic reaction of fuel injected in the main injection. That is, because the magnitude of heat energy in the piston during execution of the main injection affects the occurrence of ignition delay, in order to suppress the ignition delay, it is necessary to prescribe the amount of fuel injection in the sub injection (heat production amount-insuring injection amount).

On the other hand, in order to suppress the peak value of the amount of heat production that accompanies combustion of fuel injected in the main injection, there is the problem of how much fuel to inject in the sub injection relative to the total fuel injection amount. That is, because the peak value of the heat production ratio is affected by the size of the ratio of the sub injection (peak value suppression division ratio) to the total fuel injection amount, in order to suppress the peak value of the heat production ratio, it is necessary to prescribe the peak value suppression division ratio.

Therefore, the heat production amount-insuring injection amount is compared to the peak value suppression injection amount obtained from the peak value suppression division ratio, and the larger of these fuel injection amounts is set as the divided injection amount. Thus, it is possible to obtain a divided injection amount for the sub injection whereby it is possible to achieve suppression of the endothermic reaction in initial injection in the main injection, and also suppression of the peak value of the heat production ratio that accompanies combustion of fuel injected in the main injection.

Specifically, the following can be cited as an upper limit value and a lower limit value of the divided injection amount set by the upper/lower limit limiting portion. First, the lower limit value of the divided injection amount is set to a minimum limit injection amount of the fuel injection valve. Also, the upper limit value of the divided injection amount is set to an injection amount that minimizes ignition delay of fuel when executing the sub injection, or minimizes worsening of engine efficiency.

By giving a limit to the divided injection amount in this way, while also obtaining effects due to the sub injection (achieving a reduction in combustion noise and the amount of NOx produced), it is possible to avoid leading to ignition delay of the sub injection itself or increased combustion noise. Furthermore, with the sub injection, it is inefficient for combustion to be performed before the piston arrives at the compression top dead center (BTDC), so the injection amount that minimizes worsening of engine efficiency is an injection amount that has been limited such that, when the sub injection is executed at this timing, torque (reverse torque) is not produced before the piston arrives at the compression top dead center.

Also, as a specific configuration of the sub injection timing setting portion, when the divided injection amount is at least twice the minimum limit injection amount of the fuel injection valve, the sub injection timing setting portion executes the sub injection with multi-stage injection.

Thus, temporary injection of a comparatively large amount of fuel when executing the sub injection is prevented, and thus it is possible to avoid an ignition delay of the sub injection itself and an increase in combustion noise.

Also, the following can be cited as a configuration for correcting the above divided injection amount. That is, an increase correction portion is provided that, when a target ignition timing of fuel injected in the main injection is set to an angle later than a position where a piston has reached a compression top dead center, performs correction to increase the divided injection amount injected in the sub injection.

The reason for this is that, at the timing that the fuel injected in the main injection ignites, the piston has already begun to drop towards bottom dead center, and the heat energy corresponding to a temperature decrease that accompanies that expansion in the combustion chamber volume is supplied with the fuel injected in the sub injection. Thus, it is possible to produce high engine torque even if the target ignition timing is at an angle later (ATDC) than the position where the piston reached the compression top dead center.

Advantageous Effects

In the present invention, for a compression self-igniting internal combustion engine, as an injection amount that is injected from a fuel injection valve in a sub injection, a divided injection amount is obtained such that the amount of heat production in the initial injection period of a main injection is not reduced to a threshold value or less, and such that it is possible to suppress the peak value of the heat production ratio of heat production that accompanies combustion of the fuel that has been injected in the main injection. Therefore, it is possible to achieve a reduction in the combustion noise and the amount of NOx produced even while adequately insuring the torque of the internal combustion engine, and by constructing such control rules, it is possible to fix parameters in fuel injection, and thus it is possible to realize overall control in which an injection pattern is uniquely determined.

BRIEF DESCRIPTION OF THE DRAWINGS

FIG. 3 is a block diagram that shows the configuration of a control system of an ECU or the like.

EXPLANATION OF REFERENCE

1 Engine (power source)
1 Engine (internal combustion engine)
13 Piston
23 Injector (fuel injection valve)

DETAILED DESCRIPTION

Following is a description of an embodiment of the invention based on the drawings.

In the present embodiment, a case will be described in which the invention is applied to a common rail in-cylinder direct injection multi-cylinder (for example, inline four-cylinder) diesel engine (compression self-igniting internal combustion engine) mounted in an automobile.

—Engine Configuration—

Figure 1:
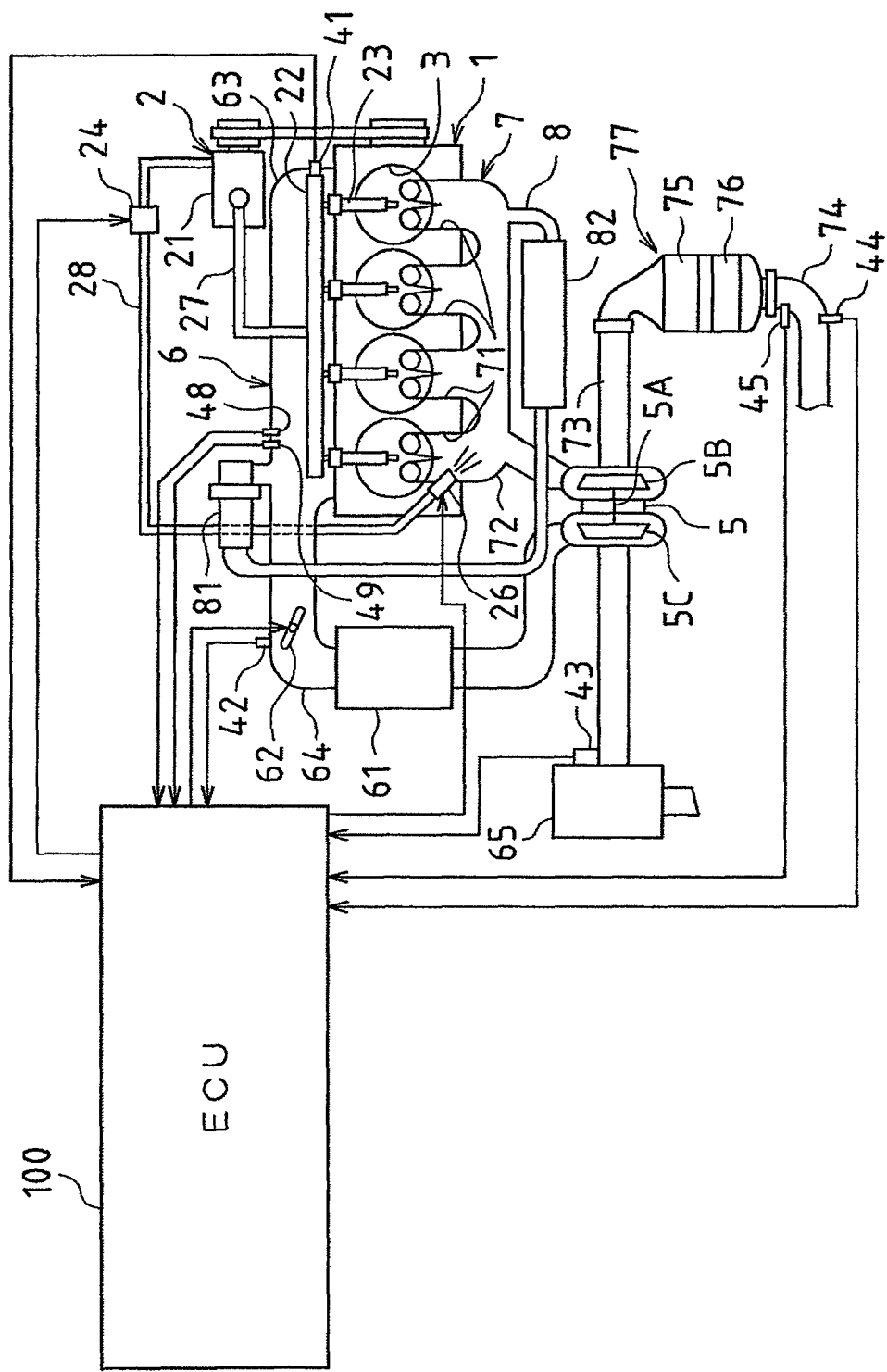
FIG. 1 is a schematic configuration diagram of an engine and a control system of the engine according to an embodiment.
Figure 2:
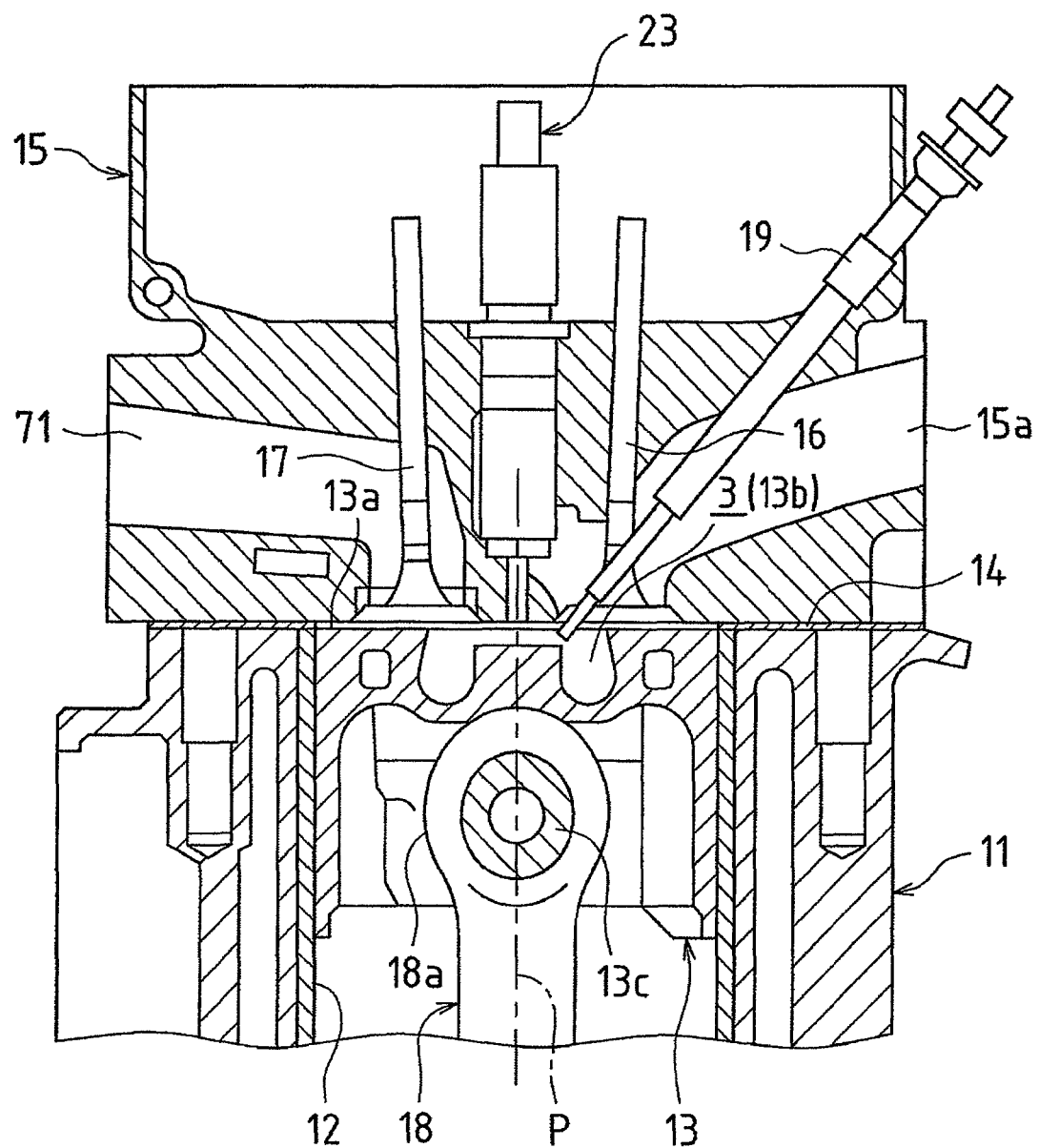
FIG. 2 is a cross-sectional view that shows a combustion chamber of a diesel engine and parts in the vicinity of the combustion chamber.

First, the overall configuration of a diesel engine (referred to below as simply the engine) according to the present embodiment will be described. FIG. 1 is a schematic configuration diagram of the engine 1 and a control system of the engine 1 according to this embodiment. FIG. 2 is a cross-sectional view that shows a combustion chamber 3 of the diesel engine and parts in the vicinity of the combustion chamber 3.

As shown in FIG. 1, the engine 1 according to this embodiment is a diesel engine system configured using a fuel supply system 2, combustion chambers 3, an intake system 6, an exhaust system 7, and the like as its main portions.

The fuel supply system 2 is provided with a supply pump 21, a common rail 22, injectors (fuel injection valves) 23, a cutoff valve 24, a fuel addition valve 26, an engine fuel path 27, an added fuel path 28, and the like.

The supply pump 21 draws fuel from a fuel tank, and after putting the drawn fuel under high pressure, supplies that fuel to the common rail 22 via the engine fuel path 27. The common rail 22 has a function as an accumulation chamber where high pressure fuel supplied from the supply pump 21 is held (accumulated) at a predetermined pressure, and this accumulated fuel is distributed to each injector 23. The injectors 23 are configured from piezo injectors within which a piezoelectric element (piezo element) is provided, and supply fuel by injection into the combustion chambers 3 by appropriately opening a valve. The details of control of fuel injection from the injectors 23 will be described later.

Also, the supply pump 21 supplies part of the fuel drawn from the fuel tank to the fuel addition valve 26 via the added fuel path 28. In the added fuel path 28, the aforementioned cutoff valve 24 is provided in order to stop fuel addition by cutting off the added fuel path 28 during an emergency.

The fuel addition valve 26 is configured from an electronically controlled opening/closing valve whose valve opening timing is controlled with an addition control operation by an ECU 100 described later such that the amount of fuel added to the exhaust system 7 becomes a target addition amount (an addition amount such that exhaust A/F becomes target A/F), or such that a fuel addition timing becomes a predetermined timing. That is, a desired amount of fuel from the fuel addition valve 26 is supplied by injection to the exhaust system 7 (to an exhaust manifold 72 from exhaust ports 71) at an appropriate timing.

The intake system 6 is provided with an intake manifold 63 connected to an intake port 15a formed in a cylinder head 15 (see FIG. 2), and an intake tube 64 that comprises an intake path is connected to the intake manifold 63. Also, in this intake path, an air cleaner 65, an airflow meter 43, and a throttle valve 62 are disposed in order from the upstream side. The airflow meter 43 outputs an electrical signal according to the amount of air that flows into the intake path via the air cleaner 65.

The exhaust system 7 is provided with the exhaust manifold 72 connected to the exhaust ports 71 formed in the cylinder head 15 (see FIG. 2), and exhaust tubes 73 and 74 that comprise an exhaust path are connected to the exhaust manifold 72. Also, in this exhaust path, a maniverter (exhaust purification apparatus) 77 is disposed that is provided with a NOx storage catalyst (NSR catalyst: NOx Storage Reduction catalyst) 75 and a DPNR catalyst (Diesel Particulate-NOx Reduction catalyst) 76, described later. Following is a description of the NSR catalyst 75 and the DPNR catalyst 76.

The NSR catalyst 75 is a storage reduction NOx catalyst, and is configured using alumina ($Al_2O_3$) as a support, with, for example, an alkali metal such as potassium (K), sodium (Na), lithium (Li), or cesium (Cs), an alkaline earth element such as barium (Ba) or calcium (Ca), a rare earth element such as lanthanum (La) or Yttrium (Y), and a precious metal such as platinum (Pt) supported on this support.

The NSR catalyst 75, in a state in which a large amount of oxygen is present in the exhaust, stores NOx, and in a state in which the oxygen concentration in the exhaust is low and a large amount of a reduction component (for example, an unburned component (HC) of fuel) is present, reduces NOx to $NO_2$ or NO and releases the resulting $NO_2$ or NO. NOx that has been released as $NO_2$ or NO is further reduced due to quickly reacting with HC or CO in the exhaust and becomes $N_2$. Also, by reducing $NO_2$ or NO, HC and CO themselves are oxidized and thus become $H_2O$ and $CO_2$. In other words, by appropriately adjusting the oxygen concentration or the HC component in the exhaust introduced to the NSR catalyst 75, it is possible to purify HC, CO, and NOx in the exhaust. In the configuration of the present embodiment, adjustment of the oxygen concentration or the HC component in the exhaust can be performed with an operation to add fuel from the aforementioned fuel addition valve 26.

On the other hand, in the DPNR catalyst 76, a NOx storage reduction catalyst is supported on a porous ceramic structure, for example, and PM in exhaust gas is captured when passing through a porous wall. When the air-fuel ratio of the exhaust gas is lean, NOx in the exhaust gas is stored in the NOx storage reduction catalyst, and when the air-fuel ratio is rich, the stored NOx is reduced and released. Furthermore, a catalyst that oxidizes/burns the captured PM (for example, an oxidization catalyst whose main component is a precious metal such as platinum) is supported on the DPNR catalyst 76.

Here, the combustion chamber 3 of the diesel engine and parts in the vicinity of the combustion chamber 3 will be described with reference to FIG. 2. As shown in FIG. 2, in a cylinder block 11 that constitutes part of the main body of the engine, a cylindrical cylinder bore 12 is formed in each cylinder (each of four cylinders), and a piston 13 is housed within each cylinder bore 12 such that the piston 13 can slide in the vertical direction.

The aforementioned combustion chamber 3 is formed on the top side of a top face 13a of the piston 13. More specifically, the combustion chamber 3 is partitioned by a lower face of the cylinder head 15 installed on top of the cylinder block 11 via a gasket 14, an inner wall face of the cylinder bore 12, and the top face 13a of the piston 13. A cavity 13b is concavely provided in approximately the center of the top face 13a of the piston 13, and this cavity 13b also constitutes part of the combustion chamber 3.

A small end 18a of a connecting rod 18 is linked to the piston 13 by a piston pin 13c, and a large end of the connecting rod 18 is linked to a crank shaft that is an engine output shaft. Thus, back and forth movement of the piston 13 within the cylinder bore 12 is transmitted to the crank shaft via the connecting rod 18, and engine output is obtained due to rotation of this crank shaft. Also, a glow plug 19 is disposed facing the combustion chamber 3. The glow plug 19 glows due to the flow of electrical current immediately before the engine 1 is started, and functions as a starting assistance apparatus whereby ignition and combustion are promoted due to part of a fuel spray being blown onto the glow plug.

In the cylinder head 15, the intake port 15a that introduces air to the combustion chamber 3 and the exhaust port 71 that discharges exhaust gas from the combustion chamber 3 are respectively formed, and an intake valve 16 that opens/closes the intake port 15a and an exhaust valve 17 that opens/closes the exhaust port 71 are disposed. The intake valve 16 and the exhaust valve 17 are disposed facing each other on either side of a cylinder center line P. That is, this engine is configured as a cross flow-type engine. Also, the injector 23 that injects fuel directly into the combustion chamber 3 is installed in the cylinder head 15. The injector 23 is disposed in approximately the center above the combustion chamber 3, in an erect orientation along the cylinder center line P, and injects fuel introduced from the common rail 22 toward the combustion chamber 3 at a predetermined timing.

Furthermore, as shown in FIG. 1, a turbocharger 5 is provided in the engine 1. This turbocharger 5 is provided with a turbine wheel 5B and a compressor wheel 5C that are linked via a turbine shaft 5A. The compressor wheel 5C is disposed facing the inside of the intake tube 64, and the turbine wheel 5B is disposed facing the inside of the exhaust tube 73. Thus the turbocharger 5 uses exhaust flow (exhaust pressure) received by the turbine wheel 5B to rotate the compressor wheel 5C, thereby performing a so-called turbocharging operation that increases the intake pressure. In this embodiment, the turbocharger 5 is a variable nozzle-type turbocharger, in which a variable nozzle vane mechanism (not shown) is provided on the turbine wheel 5B side, and by adjusting the opening degree of this variable nozzle vane it is possible to adjust the turbocharging pressure of the engine 1.

An intercooler 61 for forcibly cooling intake air heated due to supercharging with the turbocharger 5 is provided in the intake tube 64 of the intake system 6. The throttle valve 62 provided on the downstream side from the intercooler 61 is an electronically controlled opening/closing valve whose opening degree is capable of stepless adjustment, and has a function to constrict the area of the channel of intake air under predetermined conditions, and thus adjust (reduce) the supplied amount of intake air.

Also, an exhaust gas recirculation path (EGR path) 8 is provided that connects the intake system 6 and the exhaust system 7. The EGR path 8 decreases the combustion temperature by appropriately recirculating part of the exhaust to the intake system 6 and resupplying that exhaust to the combustion chamber 3, thus reducing the amount of NOx produced. Also, provided in the EGR path 8 are an EGR valve 81 that by being opened/closed continuously under electronic control is capable of freely adjusting the amount of exhaust flow that flows through the EGR path 8, and an EGR cooler 82 for cooling exhaust that passes through (recirculates through) the EGR path 8.

—Sensors—

Various sensors are installed in respective parts of the engine 1, and these sensors output signals related to environmental conditions of the respective parts and the operating state of the engine 1.

For example, the above airflow meter 43 outputs a detection signal according to an intake air flow amount (intake air amount) on the upstream side of the throttle valve 62 within the intake system 6. An intake temperature sensor 49 is disposed in the intake manifold 63, and outputs a detection signal according to the temperature of intake air. An intake pressure sensor 48 is disposed in the intake manifold 63, and outputs a detection signal according to the intake air pressure. An A/F (air-fuel ratio) sensor 44 outputs a detection signal that continuously changes according to the oxygen concentration in exhaust on the downstream side of the maniverter 77 of the exhaust system 7. An exhaust temperature sensor 45 likewise outputs a detection signal according to the temperature of exhaust gas (exhaust temperature) on the downstream side of the maniverter 77 of the exhaust system 7. A rail pressure sensor 41 outputs a detection signal according to the pressure of fuel accumulated in the common rail 22. A throttle opening degree sensor 42 detects the opening degree of the throttle valve 62.

—ECU—

Figure 3:
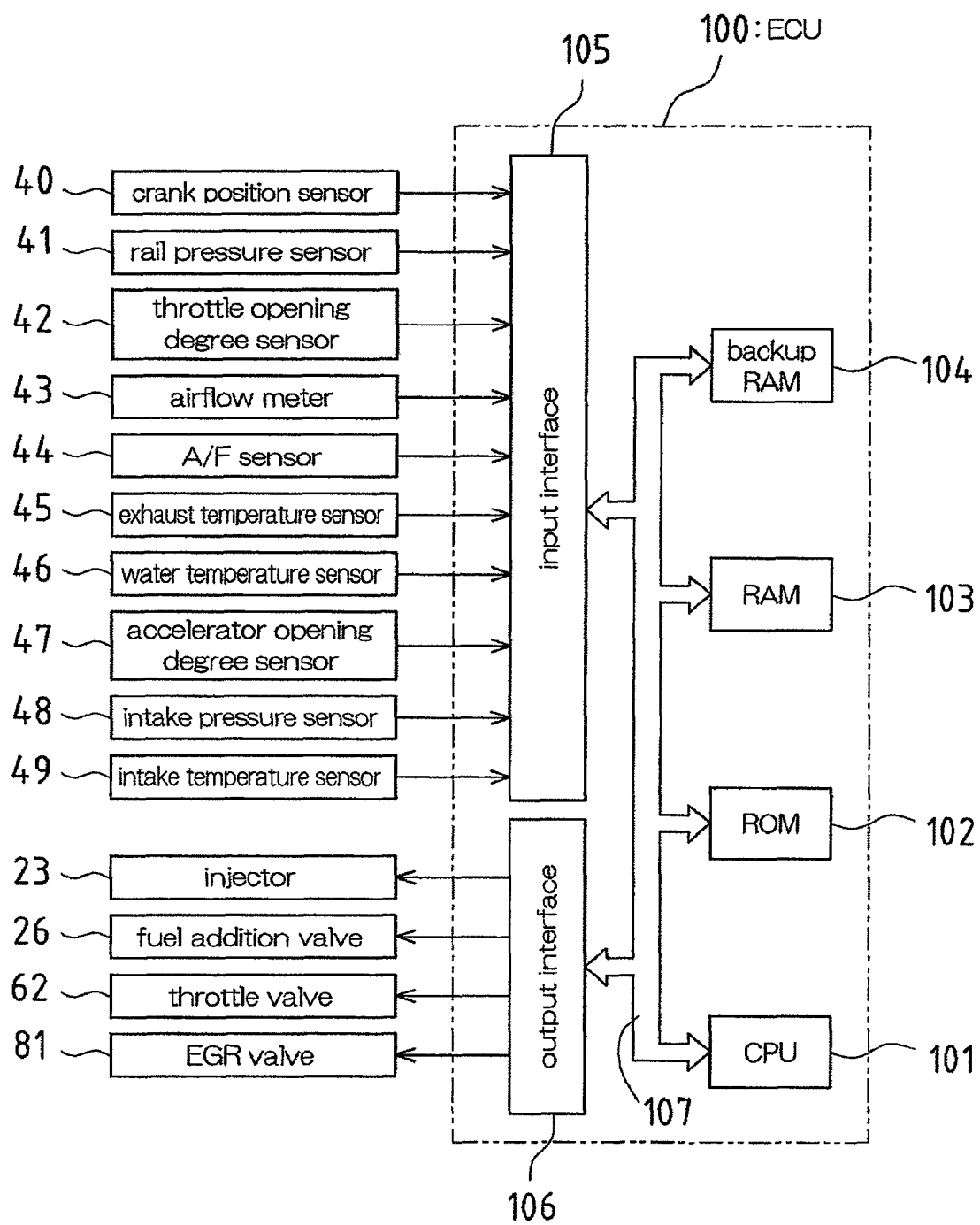

As shown in FIG. 3, the ECU 100 is provided with a CPU 101, a ROM 102, a RAM 103, a backup RAM 104, and the like. In the ROM 102, various control programs, maps that are referred to when executing those various control programs, and the like are stored. The CPU 101 executes various computational processes based on the various control programs and maps stored in the ROM 102. The RAM 103 is a memory that temporarily stores data resulting from computation with the CPU 101 or data that has been input from the respective sensors, and the backup RAM 104, for example, is a nonvolatile memory that stores that data or the like to be saved when the engine 1 is stopped.

The CPU 101, the ROM 102, the RAM 103, and the backup RAM 104 are connected to each other via a bus 107, and are connected to an input interface 105 and an output interface 106 via the bus 107.

The rail pressure sensor 41, the throttle opening degree sensor 42, the airflow meter 43, the A/F sensor 44, the exhaust temperature sensor 45, the intake pressure sensor 48, and the intake temperature sensor 49 are connected to the input interface 105. Further, a water temperature sensor 46, an accelerator opening degree sensor 47, a crank position sensor 40, and the like are connected to the input interface 105. The water temperature sensor 46 outputs a detection signal according to the coolant water temperature of the engine 1, the accelerator opening degree sensor 47 outputs a detection signal according to the amount that an accelerator pedal is depressed, and the crank position sensor 40 outputs a detection signal (pulse) each time that an output shaft (crank shaft) of the engine 1 rotates a fixed angle. On the other hand, the aforementioned injectors 23, fuel addition valve 26, throttle valve 62, EGR valve 81, and the like are connected to the output interface 106.

The ECU 100 executes various control of the engine 1 based on the output of the various sensors described above. Furthermore, the ECU 100 executes pilot injection, pre-injection, main injection, after-injection, and post injection, described below, as control of fuel injection of the injectors 23.

The fuel injection pressure when executing these injections is determined by the internal pressure of the common rail 22. As the common rail internal pressure, ordinarily, the target value of the fuel pressure supplied from the common rail 22 to the injectors 23, i.e., the target rail pressure, is set to increase as the engine load increases, and as the engine revolutions increases. That is, when the engine load is high, a large amount of air is sucked into the combustion chamber 3, so it is necessary to inject a large amount of fuel into the combustion chamber 3 from the injectors 23, and therefore it is necessary to set a high injection pressure from the injectors 23. Also, when the engine revolutions is high, the period in which injection is possible is short, so it is necessary to inject a large amount of fuel per unit time, and therefore it is necessary to set a high injection pressure from the injectors 23. In this way, the target rail pressure is ordinarily set based on the engine load and the engine revolutions.

The optimum values of fuel injection parameters for fuel injection such as the above pilot injection, main injection, and the like differ according to the engine, temperature conditions of intake air and the like.

For example, the ECU 100 adjusts the amount of fuel discharged by the supply pump 21 such that the common rail pressure becomes the same as the target rail pressure set based on the engine operating state, i.e., such that the fuel injection pressure matches the target injection pressure. Also, the ECU 100 determines the fuel injection amount and the form of fuel injection based on the engine operating state. Specifically, the ECU 100 calculates an engine rotational speed based on the value detected by the crank position sensor 40 and obtains an amount of accelerator pedal depression (accelerator opening degree) based on the value detected by the accelerator opening degree sensor 47, and determines the total fuel injection amount (the sum of the injection amount in pre-injection and the injection amount in main injection, described below) based on the engine rotational speed and the accelerator opening degree.

—Form of Fuel Injection—

Following is a general description of the operation of the pilot injection, pre-injection, main injection, after-injection, and post-injection in the present embodiment.

(Pilot Injection)

Pilot injection is an injection operation that pre-injects a small amount of fuel prior to main injection from the injectors 23. More specifically, after execution of this pilot injection, fuel injection is temporarily interrupted, the temperature of compressed gas (temperature in the cylinder) is adequately increased to reach the fuel self-ignition temperature before main injection is started, and thus ignition of fuel injected by main injection is well-insured. That is, the function of pilot injection in the present embodiment is specialized for pre-heating the inside of the cylinder. In other words, the pilot injection in the present embodiment is an injection operation for pre-heating gas within the combustion chamber 3 (pre-heating fuel supply operation).

Specifically, in this embodiment, in order to achieve an appropriate spray distribution and local concentration, an injection ratio is set to a minimum injection ratio (for example, an injection amount of 1.5 mm$^3$ per instance), and by executing pilot injection a plurality of times, a total pilot injection amount necessary in this pilot injection is insured. More specifically, the number of instances of pilot injection is determined by the following formula (1).

$$N=\{(Ca*dTs)*Kc*Kv\}/(J*Y) \quad (1)$$

(N: injection instances of pilot injection, Ca: heat capacity of air introduced into cylinder, dTs: temperature of portion that has not reached self-ignition temperature, Kc: heat capacity correction coefficient from EGR ratio, Kv: space subject to combustion contribution, J: theoretical amount of heat produced in 1.5 mm$^3$, Y: heat efficiency)

Here, the temperature dTs of the portion that has not reached self-ignition temperature is the difference between the fuel self-ignition temperature and the compressed gas temperature at the target ignition timing (for example, the timing at which the piston 13 has reached the compression top dead center) of fuel during main injection, and corresponds to the amount of heat necessary to allow the compressed gas temperature at the target ignition timing to reach the fuel self-ignition temperature. Note that in above formula (1), the pilot injection amount per one instance is set to a fixed value (for example, 1.5 mm$^3$), and by setting the number of instances of injection, the necessary total pilot injection amount is insured. This fixed value of the pilot injection amount per one instance is not limited to the value stated above.

The interval of pilot injection in which injection is divided in this manner is determined according to the response (speed of opening/closing operation) of the injectors 23. In this embodiment, the interval is set to 200 microseconds, for example. This pilot injection interval is not limited to the above value.

Furthermore, the injection start timing for this pilot injection is determined according to below formula (2), for example at a crank angle of 80 degrees or thereafter before compression top dead center (BTDC) of the piston 13.

Pilot injection start angle=pilot combustion end angle+pilot injection period working angle+(crank angle conversion value of combustion required time in one instance of pilot injection*N+crank angle conversion value of ignition delay time−crank angle conversion value of overlap time) (2)

Here, the pilot combustion end angle is an angle set in order to complete combustion by pilot injection before starting pre-injection. The ignition delay time is a delay time from the time that pilot injection is executed to the time when that fuel ignites. The overlap time is an overlap time of the combustion time of fuel from previously executed pilot injection and combustion time of fuel from subsequently executed pilot injection (time during which two combustions are simultaneously being performed), and an overlap time of the combustion time of fuel from final pilot injection and the combustion time of fuel from subsequently executed pre-injection.

(Pre-Injection)

Pre-injection is an injection operation for suppressing the initial combustion speed from main injection, thus leading to stable diffusive combustion (torque-producing fuel supply operation), and is the sub injection referred to in the present invention. That is, when the injection amount of the above main injection increases, the time needed for vaporization and latent heat absorption by the fuel injected in this main injection increases, and as a result, the fuel amount that contributes to simultaneous combustion also increases. When pre-injection is not executed, that is, when all of the total fuel injection amount is injected in main injection, the fuel amount that contributes to simultaneous combustion in initial combustion increases in proportion to the total fuel injection amount.

Figure 4:
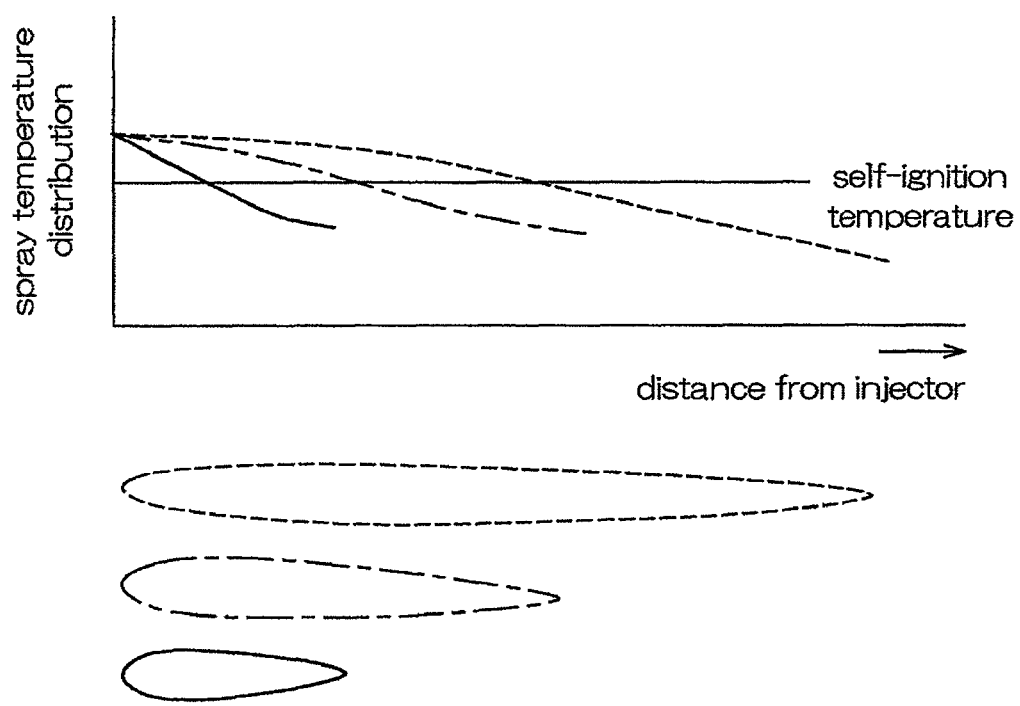
FIG. 4 shows the relationship between a total fuel injection amount and a spray temperature distribution.

FIG. 4 shows the relationship between the fuel injection amount per one instance of the fuel injection operation and the spray temperature distribution in the cylinder when that fuel injection has been performed. In FIG. 4, the total fuel injection amount increases in order from the solid line to the single dotted chained line to the broken line (see the spray shape shown in the lower part of FIG. 4). As shown in FIG. 4, the fuel amount present in the zone above the self-ignition temperature increases as the fuel injection amount increases, and as a result, the fuel amount that simultaneously burns also increases. In such a state, the combustion noise and the amount of NOx produced both increase. Therefore, pre-injection is executed prior to main injection (performing so-called pre-combustion), so the initial combustion speed from main injection is suppressed, thus leading to stable diffusive combustion. That is, by executing pre-injection, the fuel in pre-injection burns so pressure increases in the cylinder, and this is accompanied by a reduction in the fuel self-ignition temperature. Due to a reduction in the difference between the compressed gas temperature and the fuel self-ignition temperature, the fuel self-ignition delay time in main injection is shortened, and as a result, the amount of simultaneously burned fuel is reduced, so both the combustion noise and the amount of NOx produced are suppressed.

Specifically, in this embodiment, for example, a pre-injection amount is set to 10% of the total fuel injection amount (the sum of the injection amount in pre-injection and the injection amount in main injection) for obtaining the required torque determined according to the operating state, such as the engine revolutions, amount of accelerator operation, coolant temperature, and intake air temperature. The specific operation to set the pre-injection amount will be described later.

Also, the injection start angle for this pre-injection (crank angle position) is set according to below formula (3).

Pre-injection start angle=pre-combustion end angle+pre-injection period working angle+(crank angle conversion value of combustion required time in pre-injection+crank angle conversion value of ignition delay time−crank angle conversion value of overlap time) (3)

Here, the ignition delay time is a delay time from the time that pre-injection is executed to the time when that fuel ignites. The overlap time is, when pre-injection is performed a plurality of times, an overlap time of the combustion time of fuel from previously executed pre-injection and combustion time of fuel from subsequently executed pre-injection (time during which two combustions are simultaneously being performed), and an overlap time of the combustion time of fuel from final pre-injection and the combustion time of fuel from subsequently executed main injection, and also an overlap time of the combustion time of fuel from final pilot injection and the combustion time of fuel from pre-injection.

(Main Injection)

Main injection is an injection operation for producing torque of the engine 1 (torque-producing fuel supply operation). Specifically, in this embodiment, an injection amount is set that is obtained by subtracting the injection amount in the above pre-injection from the above total fuel injection amount for obtaining the required torque determined according to the operating state, such as the engine revolutions, amount of accelerator operation, coolant temperature, and intake air temperature.

Also, the injection start angle (crank angle position) for this main injection is set according to below formula (4).

Main injection start angle=main injection timing+main injection period working angle+(crank angle conversion value of combustion required time in main injection+crank angle conversion value of ignition delay time−crank angle conversion value of overlap time) (4)

Here, the ignition delay time is a delay time from the time that main injection is executed to the time when that fuel ignites. The overlap time is an overlap time of the combustion time of fuel from the above pre-injection and the combustion time of fuel from main injection, and an overlap time of the combustion time of fuel from main injection and the combustion time of fuel from after-injection.

(After-Injection)

After-injection is an injection operation for increasing the exhaust gas temperature. Specifically, in this embodiment, the combustion energy of fuel supplied by after-injection is not converted to engine torque, rather, after-injection is executed at a timing such that the majority of that combustion energy is obtained as exhaust heat energy. Also, in this after-injection as well, same as in the case of the pilot injection described above, the minimum injection ratio is set (for example, an injection amount of 1.5 mm$^3$ per instance), and by executing after-injection a plurality of times, the total after-injection amount necessary in this after-injection is insured.

(Post-Injection)

Post-injection is an injection operation for achieving increased temperature of the above maniverter 77 by directly introducing fuel to the exhaust system 7. For example, when the deposited amount of PM captured by the DPNR catalyst 76 has exceeded a predetermined amount (for example, known from detection of a before/after pressure difference of the maniverter 77), post injection is executed.

—Control Process of Pre-Injection and Main Injection—

Figure 5:
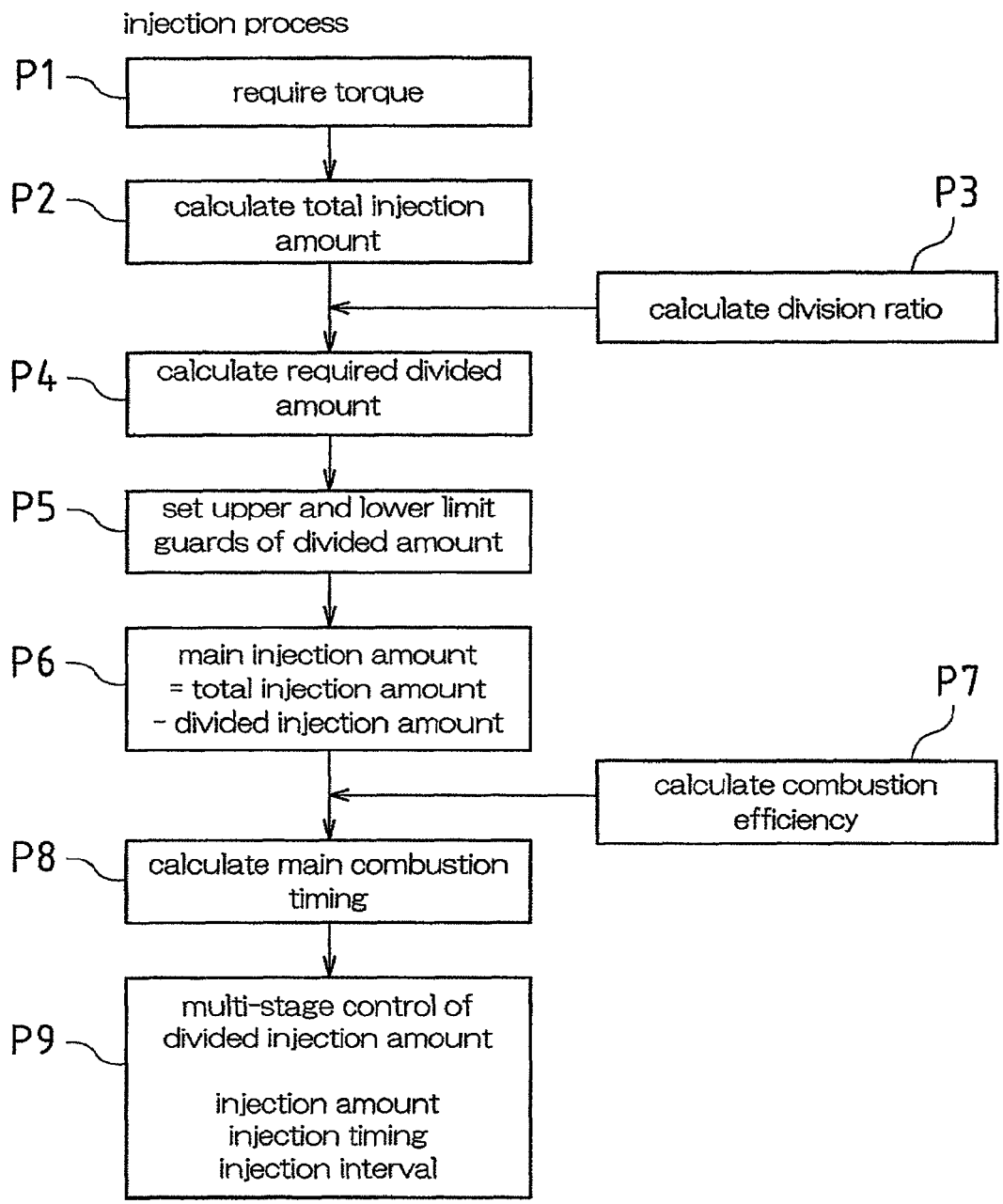
FIG. 5 shows a control process of pre-injection and main injection.

Next is a description of a control process of pre-injection and main injection with reference to FIG. 5, this control process being a distinguishing characteristic of the present embodiment.

As shown in FIG. 5, in the control process of pre-injection and main injection, first a total fuel injection amount, which is the above sum of the injection amount in pre-injection and the injection amount in main injection, is calculated for the engine torque requirement value (processes P1 and P2 in FIG. 5). That is, a total fuel injection amount is calculated as a value for producing the torque required by the engine (total fuel injection amount calculation operation by the total fuel injection amount calculation portion).

The engine torque requirement value is determined according to the operating state, such as the engine revolutions, amount of accelerator operation, coolant temperature, and intake air temperature, and according to usage conditions of accessories and the like. For example, a higher engine torque requirement value is obtained as the engine revolutions (engine revolutions calculated based on the value detected by the crank position sensor 40) increases, or as the accelerator operation amount (amount of accelerator pedal depression detected by the accelerator opening degree sensor 47) increases (as the accelerator opening degree increases).

After a total fuel injection amount has been calculated in this way, a ratio (below, referred to as the division ratio) of the injection amount in pre-injection (also referred to below as the pre-injection amount) relative to this total fuel injection amount is calculated (P3). That is, the pre-injection amount is set as an amount obtained by dividing the total fuel injection amount using the above division ratio. Below is a description of this division ratio calculation operation.

<Technical Idea for Division Ratio Calculation>

The division ratio calculation is performed based on the following technical ideas. That is, this division ratio (pre-injection amount) is obtained as a value that achieves both "suppression of ignition delay of fuel from main ignition" and "suppression of the peak value of the heat production ratio of combustion from main injection". With these two types of suppression, it is possible to achieve a reduction in combustion noise and a reduction in the amount of NOx produced, while also insuring high engine torque. Following is a specific description of the technical ideas for achieving both "suppression of ignition delay of fuel from main ignition" and "suppression of the peak value of the heat production ratio of combustion from main injection".

—Suppression of Ignition Delay of Fuel from Main Injection

The ignition delay of fuel from main injection (referred to below simply as ignition delay) is caused by an endothermic reaction by a spray that is successively added in main injection (in which the fuel spray absorbs heat energy in the cylinder as heat of vaporization), and occurs due to a reduction in heat energy occurring before the temperature in the cylinder arrives at the ignition temperature. Therefore, so as to suppress the reduction in heat energy, after fuel injection in main injection, there is a maximum amount of fuel that can initially be ignited. This maximum amount changes depending on the pressure, temperature, and spray shape at the combustion location (within the cylinder), and location of mixed gas formation. Also, when the number of nozzles, nozzle diameter, and spray angle of the injector 23 is fixed, the amount of mixed gas generated per unit time is determined by the injection pressure.

In consideration of these facts, in order to uniformly increase the temperature of the initial spray in main injection, it is necessary to suppress a continuous endothermic reaction, thereby suppressing the above ignition delay.

Consequently, as a technique of suppressing this ignition delay, separate from main injection, the above pre-injection is executed prior to main injection, so that fuel injection is intermittently performed. Thus, by suppressing a continuous endothermic reaction, and reducing the preceding division amount (fuel injection amount in pre-injection) (for example, setting to the minimum limit injection amount of the injector 23), the amount of heat absorbed in the endothermic reaction of fuel itself that is injected in pre-injection is reduced. Thus, the above ignition delay can be suppressed. That is, before occurrence of a continuous endothermic reaction (an endothermic reaction by fuel injected in main injection), by pre-heating the combustion location along with execution of pre-injection, the necessary heat energy for ignition of the initial spray in main injection is insured and thus the above ignition delay is suppressed. In other words, in the injection start initial period of main injection, the combustion location is preheated by execution of pre-injection such that in the balance of heat between the amount of heat absorbed by the endothermic reaction of fuel injected with main injection and the amount of heat produced due to this fuel igniting and burning, the amount of heat produced is larger (as stated in the present invention, "such that the amount of heat produced during the initial injection period of main injection does not decrease to a threshold value or less").

—Suppression of Peak Value of Heat Production Ratio of Combustion from Main Injection When mixed gas is supplied continuously for a short period in the combustion chamber, i.e., in a state where a comparatively large amount of fuel has been injected into the combustion chamber in a short time and so a comparatively large amount of combustible mixed gas is generated, this leads to an increase in the peak value of the heat production ratio of combustion by main injection. Therefore, as described above, pre-injection is executed prior to main injection, thus changing to intermittent fuel injection (changing to multi-stage supply of mixed gas). Thus, the combustion time is expanded and divided combustion is performed, so that it is possible to suppress the peak value of the heat production ratio of combustion from main injection to less than a threshold value (less than a peak value at which it is possible to adequately reduce the combustion noise and the amount of NOx produced when fuel injected in main injection is burned).

<Calculation of Division Ratio>

—Concept of Division Ratio Calculation Technique

Based on the above technical ideas for the division ratio calculation, in this embodiment, a division ratio is calculated with the following operation. That is, an amount of heat energy that contributes to combustion of initial spray in main injection is prepared by executing pre-injection prior to the start of main injection, such that the following formula (5) is satisfied.

$$\text{Newly produced heat energy} \geq \text{heat energy absorbed by newly supplied mixed gas} \quad (5)$$

Here, newly produced heat energy is heat energy produced due to burning of fuel injected in pre-injection. Heat energy absorbed by newly supplied mixed gas is heat energy in the cylinder absorbed by the endothermic reaction of fuel injected in main injection. By satisfying formula (5), it is possible to adopt a configuration in which the amount of heat produced in the initial injection period of main injection (balance of the amount of heat absorbed by injected fuel (a negative heat amount) and the amount of heat produced by combustion of fuel (a positive heat amount)) is not reduced to a threshold value or less.

If the combustion pressure is the same, the speed of increase in the fuel injection ratio is also the same, so if the shape, swirl flow, and squish flow of the combustion chamber 3 are the same, the speed of mixed gas formation is also the same. Also, it is necessary to supply an appropriate amount of heat energy and oxygen to the combustion location in order for the mixed gas to become combustible mixed gas. When a part of the newly supplied mixed gas does not burn and so a remainder is produced, the remaining part is diverted to the next instance of combustion, and therefore it appears that the supplied mixed gas increases. Furthermore, when the fuel injection ratio decreases due to a valve closing operation of the injector 23, the supplied amount of the newly supplied mixed gas also decreases. Also, the above diffusive combustion is produced only with involvement in initial combustion in main injection. In consideration of these facts, the amount of heat energy absorbed by the newly supplied mixed gas in formula (5) is obtained, and the above division ratio is calculated such that a heat energy that is at least this absorbed heat energy is obtained by the newly produced heat energy.

—Calculation of Heat Energy Necessary for Initial Combustion in Main Injection

The heat energy necessary for initial combustion in main injection is calculated based on the following technical ideas.

In order to suppress the ignition delay of fuel from main injection, it is necessary to reduce the amount of heat energy absorbed in the endothermic reaction of fuel injected in main injection. That is, the amount of heat energy in the cylinder when main injection is executed affects the occurrence of ignition delay. Therefore, in order to suppress the ignition delay, it is necessary to prescribe the amount of fuel injection in pre-injection.

On the other hand, the question of what amount of fuel to inject in pre-injection relative to the total fuel injection amount in order to suppress the peak value of the heat production ratio of combustion from main injection is a problem. More specifically, the peak value of the heat production ratio increases as the ratio of pre-injection to the total fuel injection amount grows smaller, and the peak value of the heat production ratio decreases when the ratio of pre-injection is enlarged. That is, the peak value of the heat production ratio is affected by the size of the ratio of the pre-injection amount to the total fuel injection amount. Therefore, it is necessary to prescribe the ratio (division ratio) of the pre-injection amount to the total fuel injection amount in order to suppress the peak value of the heat production ratio. Therefore, in order to suppress the peak value of the heat production ratio, there is a specific value (for example, 10%) as the ratio (division ratio) of the pre-injection amount to the total fuel injection amount, and a divided injection amount (pre-injection amount) is obtained by multiplying the division ratio by the total fuel injection amount.

For the above reasons, in the case of this embodiment, the division ratio calculation operation described below is performed as a specific technique for achieving both "suppression of ignition delay of fuel from main ignition" and "suppression of the peak value of the heat production ratio of combustion from main injection".

Specifically, the division ratio in pre-injection required in order to achieve suppression of the peak value of the heat production ratio is compared to the fuel injection amount in pre-injection required in order to achieve suppression of ignition delay. The fuel injection amount is obtained that is the larger of the fuel injection amount obtained from the division ratio in pre-injection required in order to suppress the peak value of the heat production ratio (this fuel injection amount changes according to the total fuel injection amount) and the fuel injection amount in pre-injection required in order suppress ignition delay.

Specifically, in the case of a condition in which suppression of ignition delay is required more than suppression of the peak value of the heat production ratio, for example, a condition in which the total fuel injection amount is comparatively small, so that injection delay easily occurs, the fuel injection amount in pre-injection required in order to suppress ignition delay is greater than the fuel injection amount in pre-injection required in order to suppress the peak value of the heat production ratio. In this case, settings are made such that pre-injection is executed with the fuel injection amount in pre-injection that is required in order to achieve suppression of ignition delay (pre-injection settings with priority given to suppression of ignition delay).

On the other hand, in the case of a condition in which suppression of the peak value of the heat production ratio is required more than suppression of ignition delay, for example, a condition in which the total fuel injection amount is comparatively large, so that an increase in the peak value of the heat production ratio easily occurs, the fuel injection amount in pre-injection required in order to suppress the peak value of the heat production ratio is greater than the fuel injection amount in pre-injection required in order to suppress ignition delay. In this case, the above division ratio that is set in order to achieve suppression of the peak value of the heat production ratio is adopted, and settings are made such that pre-injection is executed with the pre-injection amount obtained based on this division ratio (by multiplying the division ratio by the total fuel injection amount)(pre-injection settings with priority given to suppression of the peak value of the heat production ratio).

Examples of correction factors when calculating the division ratio include churning ability and oxygen supply amount in the cylinder, and the concentration of that oxygen (EGR ratio). The division ratio is corrected and calculated from these correction factors.

In P4 shown in FIG. 5, the pre-injection amount in pre-injection that has been set in the above manner is calculated. That is, in the case of pre-injection in which priority is given to suppression of ignition delay, the pre-injection amount required in order to achieve suppression of delay ignition delay is adopted as-is. On the other hand, in the case of pre-injection in which priority is given to suppression of the peak value of the heat production ratio, the pre-injection amount obtained by multiplying the division ratio by the total fuel injection amount is adopted (division injection amount calculation operation by the division injection amount calculation portion).

In this case, when the obtained pre-injection amount is less than 1.5 mm$^3$, this is less than the minimum limit injection amount of the injectors 23, so the fuel injection amount in pre-injection is set to the minimum limit injection amount (1.5 mm$^3$) of the injectors 23. On the other hand, when the total injection amount of pre-injection is required to exceed the minimum limit injection amount of the injectors 23, by executing pre-injection a plurality of times, the total injection amount necessary in this pre-injection is insured. For example, when the pre-injection amount is 5 mm3, a 1.5 mm$^3$ injection, which is the minimum limit injection amount of the injectors 23, is performed twice, and afterward a 2.0 mm$^3$ injection is performed once. Furthermore, when the pre-injection amount is 2.0 mm$^3$, a 1.5 mm$^3$ injection, which is the minimum limit injection amount of the injectors 23, is performed twice, and thus a pre-injection amount that is at least the necessary injection amount is insured.

Also, in this embodiment, when the target ignition timing of main injection is set near the compression top dead center (TDC) of the piston 13, the division ratio (the division ratio in a case where priority is given to suppression of the peak value of the heat production ratio) is uniformly set to 10%, for example. However, this value is not limited to such a setting.

Also, when the target ignition timing of main injection is set away from the compression top dead center (TDC) of the piston 13, after the piston 13 arrives at the compression top dead center (ATDC), the pre-injection amount is corrected to an increased amount (divided injection amount increase correction operation by the increase correction portion). This is because at the timing that the fuel injected in main injection ignites, the piston 13 has already begun to fall towards the bottom dead center, and the heat energy corresponding to a temperature decrease that accompanies an increase in the combustion chamber volume is replenished by the fuel injected in pre-injection. Thus, it is possible to produce a high engine torque even if the target ignition timing is set at the ATDC. Also, in this case, because it is possible for the ignition delay in the course of expansion to result in an ignition failure, pre-injection is executed to make it possible to prevent the occurrence of ignition delay. That is, even if the temperature in the cylinder at the target ignition timing is increased and the self-ignition temperature of fuel increases along with a decrease in the pressure in the cylinder, the pre-injection amount is corrected to increase such that heat energy whereby fuel in main injection can ignite adequately is insured within the cylinder.

<Upper/Lower Limit Guards of Division Amount>

The division amount (pre-injection amount) calculated as described above is given upper limit value and lower limit value guards as described below (upper/lower limit value limiting operation by the upper/lower limit limiting portion: P5 in FIG. 5).

—Setting of Lower Limit Value of Divided Injection Amount (A) An example of the lower limit value of the divided injection amount is a minimum injection amount such that precision of the injector 23 can be guaranteed. In this embodiment, an example of the minimum limit injection amount of the injector 23 is 1.5 mm$^3$. That is, when the divided injection amount is calculated to be less than 1.5 mm$^3$, the divided injection amount is set to 1.5 mm$^3$.

(B) Also, when the combustion diffusion speed exceeds the ignition temperature attainment speed, the air-fuel ratio becomes more lean than the combustible air-fuel ratio, and the diffusion speed changes according to, for example, the volume of the injection space (changing due to piston position), the oxygen concentration, the oxygen amount, the influence of swirl current and squish current, the amount of fuel, and the like.

In consideration of these facts, a required minimum limit fuel injection amount that makes it possible to form the combustible air-fuel ratio is set as the lower limit value of the divided injection amount. That is, of the lower limit values set in (A) and (B) above, the higher value is adopted as the lower limit value of the divided injection amount.

—Setting of Upper Limit Value of Divided Injection Amount (C) As the upper limit value of the divided injection amount, an upper limit injection amount for minimizing the fuel ignition delay is set.

(D) Also, an upper limit injection amount is set as the required minimum limit value that is set in order to suppress combustion noise.

(E) Furthermore, an upper limit injection amount is set in consideration of injection efficiency. For example, because it is ineffective to perform combustion prior to the piston 13 reaching the compression top dead center (BTDC), in a case where pre-injection is executed at this timing, the upper limit injection amount is set such that torque (reverse torque) is not produced prior to the piston 13 reaching the compression top dead center.

In consideration of these facts, the upper limit value of the divided injection amount is set. That is, of the upper limit values respectively set in (C), (D), and (E) above, the lowest value is adopted as the upper limit value of the divided injection amount.

Figure 6:
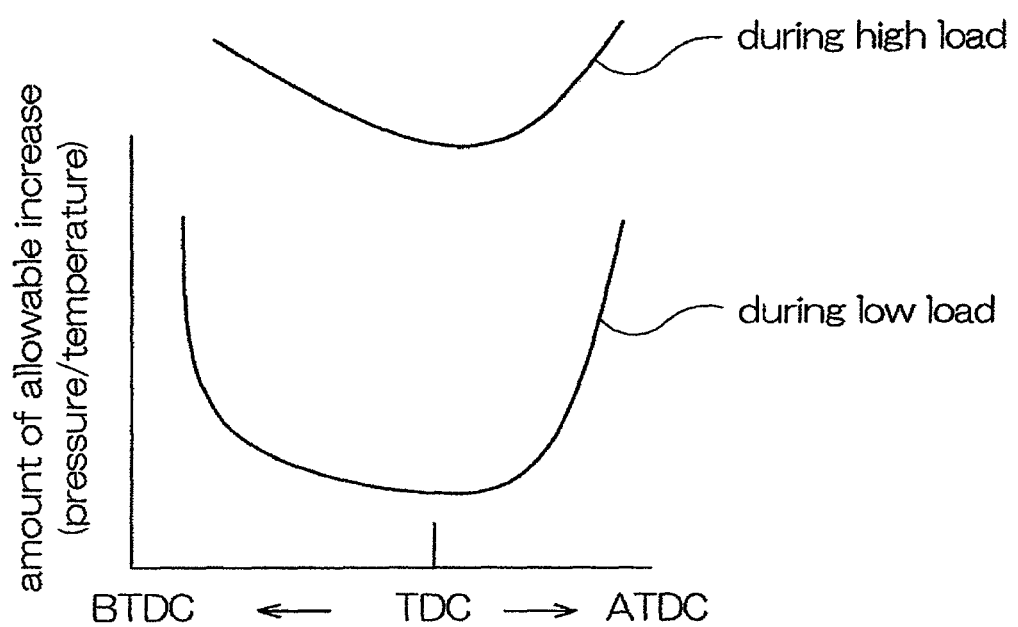
FIG. 6 shows the relationship between injection timing of pre-injection, engine load, and a divided injection amount upper limit value.

Furthermore, this upper limit value of the divided injection amount may be changed according to the injection timing of pre-injection and the load state of the engine 1. FIG. 6 shows the upper limit value of the divided injection amount in this case. That is, as the injection timing of pre-injection nears the compression top dead center (TDC) of the piston 13, the upper limit value of the divided injection amount is set lower, and thus, the allowed amount of increase of the pressure and temperature inside the cylinder is limited. Also, the upper limit value of the divided injection amount is set lower when the engine 1 is in a low-load state than when the engine 1 is in a high-load state. The reason for this is that when the engine 1 is in a low-load state, in this condition the combustion noise in main injection is low, so in this case, when the amount of pre-injection is large, it is possible that the proportion of combustion noise caused by pre-injection will increase relative to the overall combustion noise of the engine 1, so with the above configuration this is avoided and the quietness of the engine 1 is increased.

<Calculation of Main Injection Amount>

Using the divided injection amount that has been given the upper and lower limit guards and set as described above, the main injection amount is calculated with the following formula (6)(P6 in FIG. 5).

$$\text{Main injection amount} = \text{total fuel injection amount} - \text{divided injection amount} \quad (6)$$

<Calculation of Combustion Efficiency>

The following two types of multi-stage injection forms are selected in consideration of combustion efficiency when executing pre-injection (P7 in FIG. 5).

—Form of Multi-Stage Injection with Independent Heat Production Ratio

Figure 7:
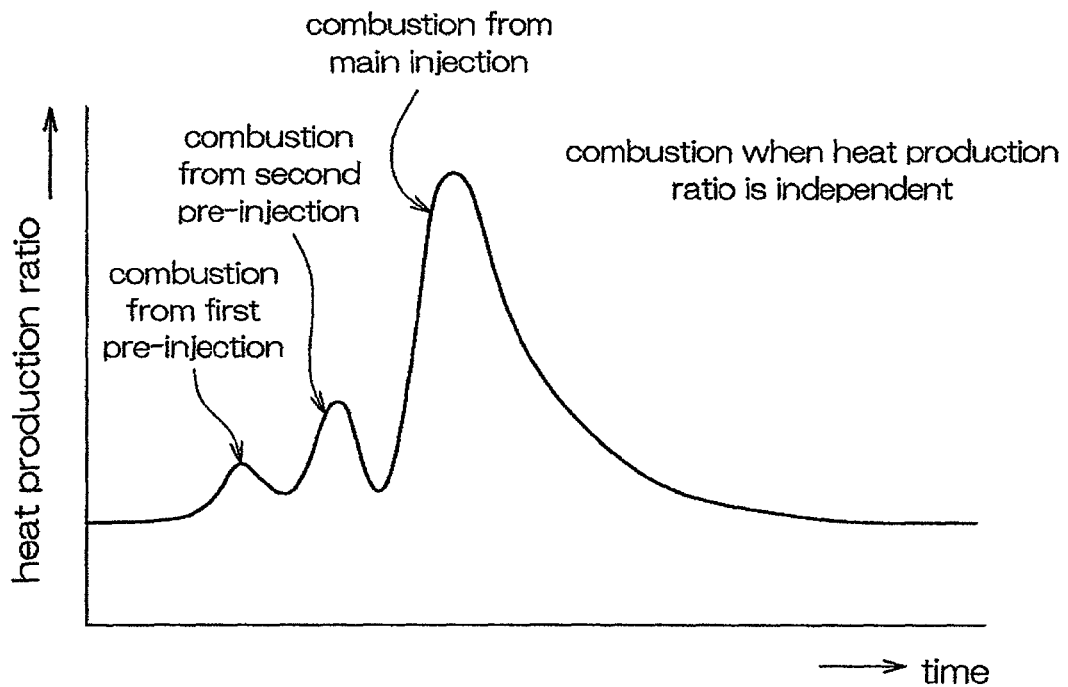
FIG. 7 shows changes in a heat production ratio in a multi-stage injection form in which the heat production ratio is independent.

This form of injection is for insuring the maximum limit of heat energy necessary in preheating, and is set so as to start combustion in next injection (subsequent pre-injection) at a slow combustion portion after ending sudden combustion when starting execution of pre-injection. Thus, as shown in FIG. 7, a state is established that comprises a heat production ratio for which the fuel injected in individual pre-injection (first and second pre-injection) and the fuel injected in main injection are independent.

—Form of Multi-Stage Injection with Dependent Heat Production Ratio

Figure 8:
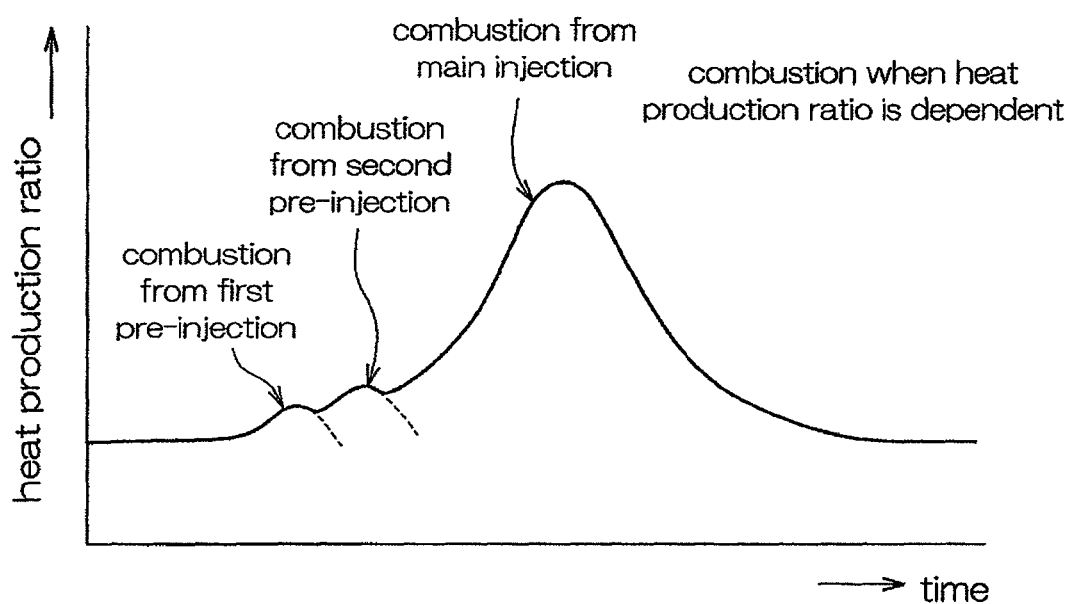
FIG. 8 shows changes in a heat production ratio in a multi-stage injection form in which the heat production ratio is dependent.

In this form of injection, the heat production ratio is made uniform, so that changes in the heat production ratio form an envelope curve, and the heat production ratio is set so as to start combustion in next injection (subsequent pre-injection) prior to ending sudden combustion when starting execution of pre-injection. Thus, as shown in FIG. 8, a state is established that comprises a heat production ratio in which the fuel injected in individual pre-injection (first and second pre-injection) and the fuel injected in main injection are each continuous. The broken line in FIG. 8 indicates changes in the heat production ratio that accompany combustion of fuel injected in the preceding pre-injection (first pre-injection that precedes the second pre-injection, and second pre-injection that precedes the main injection).

With respect to independence and dependence of the form of such multi-stage injection, there is no limitation to making all combustion of fuel injected respectively in pre-injection and main injection independent, or making all of that combustion independent; this combustion may have both independence and dependence, as described below.

For example, when two instances of pre-injection are executed, combustion in preceding pre-injection (first pre-injection) and combustion in subsequent pre-injection (second pre-injection) are made independent, and combustion in second pre-injection and combustion in main injection are made dependent. In this case, the injection timing of first pre-injection is such that pre-injection is executed on the advance side with respect to the compression top dead center of the piston 13, and so spray diffuses throughout a wide range within the cylinder. Therefore, it is possible to form a premix state with the fuel injected in first pre-injection. In this case, the air-fuel ratio within the cylinder partially becomes lean, so a region occurs where there is no ignition, and therefore part (for example, about 60%) of the fuel injected in first pre-injection becomes leftover fuel that does not burn by the time that the piston 13 arrives near the compression top dead center, and this leftover fuel burns along with the fuel injected in second pre-injection when the second pre-injection is executed. As a result, it is possible to increase the dependency of combustion in second pre-injection and combustion in main injection.

Also, it is possible to make combustion in first pre-injection and combustion in second pre-injection dependent, and to make combustion in second pre-injection and combustion in main injection independent.

As described above, it is possible to adjust the injection timing of pre-injection and the injection timing of main injection, so it is possible to establish a state in which the fuel (cluster of spray) injected in pre-injection and the fuel (cluster of spray) injected in main injection overlap, or a state in which they do not overlap. Here, combustion in the former injection state is referred to as "overlapping combustion", and combustion in the latter injection state is referred to as "adjacent combustion". The details of these types of combustion are described below.

<Calculation of Main Combustion Timing>

Main combustion timing is set in the following manner (operation to set the injection timing of main injection by the main injection timing setting portion: P8 in FIG. 5).

When ignition delay is suppressed with multi-stage divided injection as described above, and it is possible that the peak heat production ratio will decrease, the main combustion timing is set near the compression top dead center (TDC) of the piston 13. That is, the timing with the highest heat efficiency is set as the target ignition timing.

On the other hand, when the amount of pre-injection is inadequate to suppress the peak value of the heat production ratio, the main combustion timing is fixed, the oxygen concentration is reduced by increasing the EGR ratio, reduction of the fuel pressure, gas filling amount, and the like are performed, and thus the mixed gas supply speed is reduced.

Also, there may be cases when the main combustion timing is set to an angle later (ATDC) than the compression top dead center (TDC) of the piston 13, in response to a need to improve exhaust emissions. For example, when a large amount of NOx is discharged, the main combustion timing is set to an angle later than the compression top dead center, thus reducing the combustion temperature.

<Multi-Stage Control of Divided Injection Amount>

As necessary for the pre-injection amount obtained in the manner described above, fuel injection is performed intermittently by multi-stage injection. That is, based on the above pre-injection amount obtained at P4 in FIG. 5, the injection timing and injection interval are set, and from these settings the injection pattern of pre-injection is determined (injection timing setting operation by the sub injection timing setting portion: P9 in FIG. 5).

A required time is calculated as the injection interval from the required preheating energy and the injection amount. Specifically, the injection interval is calculated with the following formula (7).

$$\text{Main ignition timing} + \text{divided injection combustion period} + \text{ignition delay time (including injection delay)} \quad (7)$$

For example, as described above, when the total injection amount of pre-injection is less than 1.5 mm³ (minimum limit injection amount of injector 23), the fuel injection amount in pre-injection is set to 1.5 mm³.

When the total injection amount of pre-injection is 5 mm³, an injection of 1.5 mm³, which is the minimum limit injection amount of injector 23, is performed twice, and then an injection of 2.0 mm³ is performed once. In this case, 200 microseconds are set as the injection interval, for example.

Due to pre-injection and main injection being executed with the control process of pre-injection and main injection as described above, it is possible to achieve a reduction in combustion noise and the amount of NOx produced while also insuring a high engine torque.

Figure 9:
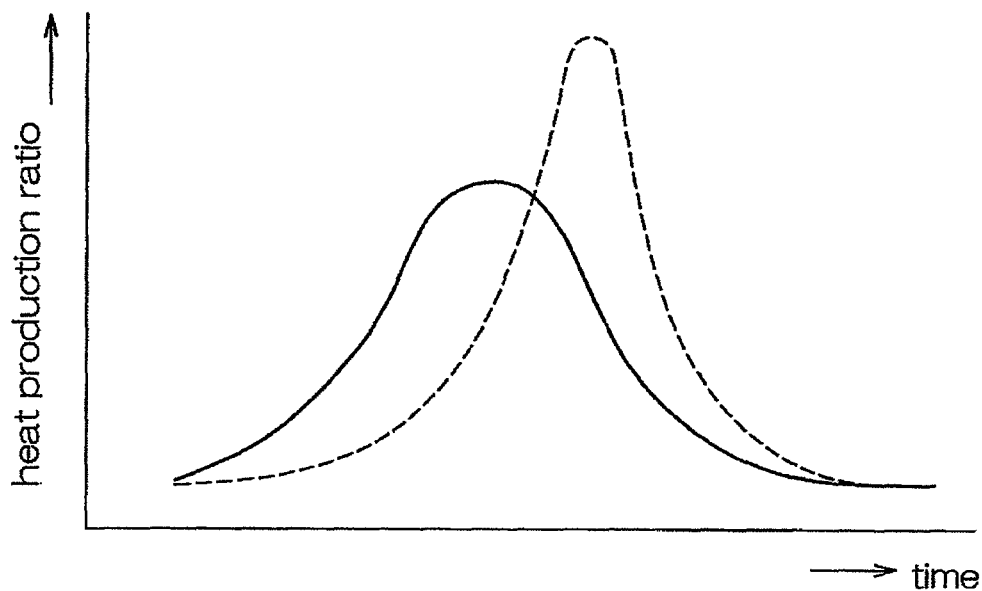
FIG. 9 shows changes in the ratio of heat production that accompanies combustion in a cylinder in a case where pre-injection and main injection have been executed with the control process according to an embodiment, and changes in the ratio of heat production that accompanies combustion in the cylinder in a case where pre-injection is not executed.

FIG. 9 shows changes in the ratio of heat production that accompanies combustion in the cylinder in a case where pre-injection and main injection have been executed with the control process according to this embodiment (indicated by the solid line in FIG. 9), and changes in the ratio of heat production that accompanies combustion in the cylinder in a case where pre-injection is not executed (indicated by the broken line in FIG. 9). As is clear from FIG. 9, according to the configuration of this embodiment, the amount of increase in the heat production ratio per unit time is suppressed, and the peak value of the heat production ratio also is suppressed to a low level. Therefore, it is possible to confirm that it is possible to achieve a reduction in combustion noise and the amount of NOx produced.

Figure 10:
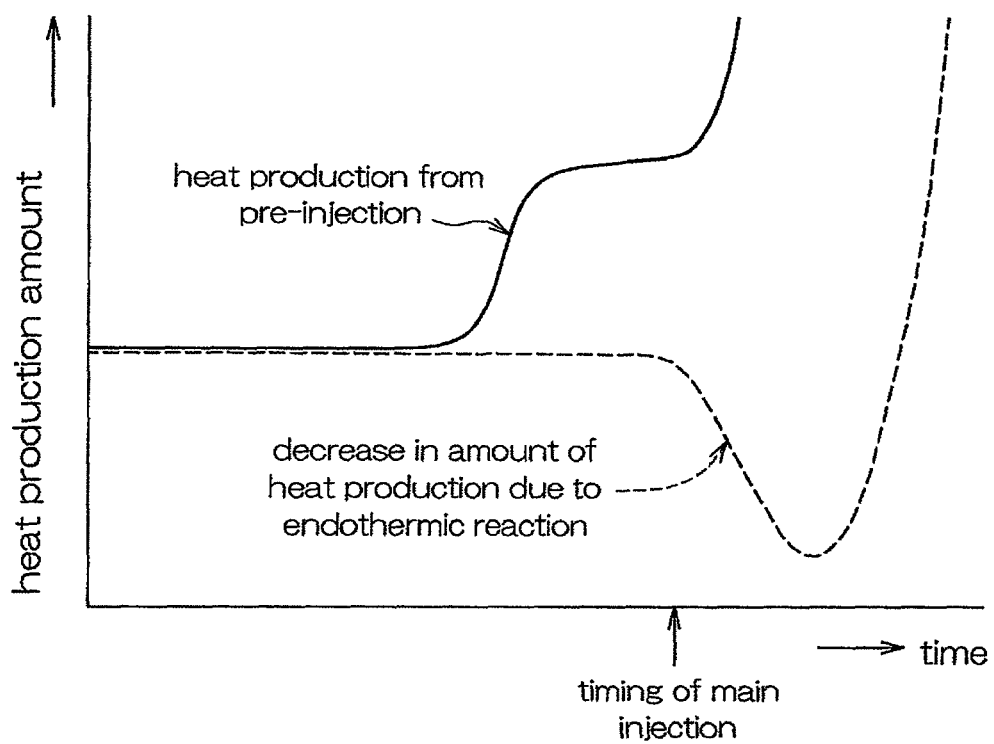
FIG. 10 shows changes in the ratio of heat production that accompanies combustion in a cylinder in a case where pre-injection and main injection have been executed with the control process according to an embodiment, and changes in the ratio of heat production that accompanies combustion in the cylinder in a case where pre-injection is not executed.

FIG. 10 shows changes in the amount of heat production near the main injection executing timing, and shows changes in the amount of heat production that accompanies combustion in the cylinder in a case where pre-injection and main injection have been executed with the control process according to this embodiment (indicated by the solid line in FIG. 10), and changes in the amount of heat production that accompanies combustion in the cylinder in a case where pre-injection is not executed (indicated by the broken line in FIG. 10). As is clear from FIG. 10, it is possible to confirm that with a conventional configuration, a drop in the amount of heat production due to the endothermic reaction of fuel accompanying execution of main injection can be confirmed, and afterward, the amount of heat production suddenly rises, so combustion noise and the amount of NOx produced increase. On the other hand, it is possible to confirm that according to the configuration of this embodiment, there is almost no drop in the amount of heat production at the main injection execution timing, and the amount of heat production gently rises, so that it is possible to achieve a reduction in combustion noise and the amount of NOx produced.

—Adjacent Combustion and Overlapping Combustion—

With pre-injection and main injection in the present embodiment, by adjusting the inter-injection interval between this pre-injection (final pre-injection in a case where pre-injection is executed a plurality of times) and main injection, the form of combustion within the combustion chamber 3 is switched between the above "adjacent combustion" and "overlapping combustion". Below is a description of this adjacent combustion and overlapping combustion.

In the course of intake in the engine 1, with respect to the flow of air that flows into the cylinder from the intake port 15a, the aforementioned swirl flow is produced with the cylinder center line P as a center of rotation, and this swirl flow occurs continuously in the cylinder even during the compression stroke.

Therefore, the fuel injected in pre-injection flows within the cylinder in the circumferential direction due to this swirl flow. That is, with passage of time in the compression stroke, fuel injected in pre-injection (cluster of fuel spray) flows in the circumferential direction along the swirl flow from the position opposite to the injection nozzle of the injector 23 (position immediately after injection).

Accordingly, at the time when main injection is executed, the fuel injected in pre-injection is already flowing in the circumferential direction within the cylinder, so that fuel of pre-injection and fuel of main injection injected from the same nozzle do not overlap (clusters of fuel from both types of injection do not join together):

In this case, pre-injection fuel injected from an injection nozzle on the upstream side in the swirl flow direction is flowing towards a position facing an injection nozzle on the downstream side in the swirl flow direction, so by adjusting the injection timing of main injection, it is possible to allow fuel of this main injection and fuel of pre-injection injected from the injection nozzle on the upstream side in the swirl flow direction to join, or to prevent such joining. Overlapping combustion is a form of combustion in which fuel is burned in a state in which fuel of main injection and fuel of pre-injection have been joined, and adjacent combustion is a form of combustion in which fuel is burned in a state in which fuel of main injection and fuel of pre-injection have not been allowed to join.

More specifically, in the interval from when the piston 13 is at bottom dead center until the piston 13 reaches top dead center (during movement of 180 degrees in terms of the crank angle), a case is considered in which the swirl flow circles once in the circumferential direction within the cylinder. That is, the swirl ratio is "2". Also, a case is considered in which the number of injector 23 injection ports is "10", and fuel injection is performed twice (first pre-injection and second pre-injection) as pre-injection.

In this case, if the interval between first and second pre-injections and the interval between pre-injection and main injection is set to 18 degrees (9 degrees in terms of crank angle) in the circumferential direction within the cylinder, overlapping combustion, i.e., performance of combustion with the fuel injected in main injection overlapping the fuel injected in first pre-injection, can be realized.

In a case where fuel injection is performed three times as pre-injection, even if the interval between pre-injections and the interval between pre-injection and main injection is set to 12 degrees (6 degrees in terms of crank angle) in the circumferential direction within the cylinder, overlapping combustion, i.e., performance of combustion with the fuel injected in main injection overlapping the fuel injected in first pre-injection, can be realized.

More specifically, the angle (offset angle) in the circumferential direction within the cylinder for setting the above intervals is determined by the following formula (8).

$$\text{Offset angle} = (360/\text{number of injector injection ports})/\text{swirl ratio} \qquad (8)$$

On the other hand, when setting to an interval other than an interval such that overlapping combustion is performed, the result is adjacent combustion, in which combustion is performed in a state in which fuel injected in pre-injection and fuel injected in main injection do not overlap.

Specifically, when the above overlapping combustion has been performed, before main injection is executed, in a region where fuel will be injected in that main injection, oxygen is consumed by combustion of fuel from pre-injection, and the oxygen density in this region is reduced once main injection has been executed, so combustion immediately after main injection is slow and thus it is possible to suppress a sudden increase in the combustion temperature. Therefore, it is possible to achieve a reduction in combustion noise and the amount of NOx produced due to combustion of fuel injected in main injection.

On the other hand, when the above adjacent combustion has been performed, oxygen concentration in the fuel injection region once main injection has been executed is adequately insured, and after main injection, within a short time it is possible to move to diffusive combustion, and therefore possible to output a high torque.

As described above, in this embodiment, the forms of injection in pre-injection and main injection can be set with the series of control processes shown in FIG. 5, and by construction of control rules that do not exist in the conventional technology, it becomes possible to fix the parameters in injection, and thus possible to realize overall control that uniquely determines the injection pattern of pre-injection and main injection. Due to pre-injection and main injection being executed with the control process of pre-injection and main injection as described above, it is possible to achieve a reduction in combustion noise and the amount of NOx produced while also insuring a high engine torque.

—Other Embodiments—

In the embodiment described above, a case was described in which the invention is applied to an in-line four-cylinder diesel engine mounted in an automobile. The invention is not limited to use in an automobile, and is also applicable to engines used in other applications. Also, the number of cylinders and the form of the engine (in-line engine, V-type engine, or the like) is not particularly limited.

Further, in the above embodiment, the maniverter 77 is provided with the NSR catalyst 75 and the DPNR catalyst 76, but a maniverter 77 provided with the NSR catalyst 75 and a DPF (Diesel Particulate Filter) may also be adopted.

The present invention may be embodied in various other forms without departing from the spirit or essential characteristics thereof. The embodiments disclosed in this application are to be considered in all respects as illustrative and not limiting. The scope of the invention is indicated by the appended claims rather than by the foregoing description, and all modifications or changes that come within the meaning and range of equivalency of the claims are intended to be embraced therein.

This application claims priority under 35 U.S.C. Section 119(a) on Japanese Patent Application No. 2007-316992 filed in Japan on Dec. 7, 2007, the entire contents of which are herein incorporated by reference. Furthermore, the entire contents of references cited in the present description are herein specifically incorporated by reference.

The invention claimed is:

1. A fuel injection control apparatus of a compression self-igniting internal combustion engine that, with a fuel injection valve, is capable of performing injection by dividing an amount of fuel injected in order to contribute to torque production of the internal combustion engine between a main injection and a sub injection that is performed prior to the main injection, the fuel injection control apparatus comprising:
   a total fuel injection amount calculation portion that calculates a total fuel injection amount that contributes to torque production based on the torque required by the internal combustion engine;
   a divided injection amount calculation portion that obtains, as a divided injection amount that is divided from the total fuel injection amount, an injection amount when executing the sub injection that prevents a heat production amount in initial injection of the main injection from decreasing to a threshold value or less, and suppresses a peak value of a heat production ratio that accompanies combustion of fuel injected in the main injection to less than a predetermined value;
   an upper/lower limit limiting portion that gives a limit at predetermined upper and lower limit values to the divided injection amount obtained with the divided injection amount calculation portion; and
   a sub injection timing setting portion that sets an injection timing in execution of the sub injection of the divided injection amount obtained by giving a limit with the upper/lower limit limiting portion.

2. The fuel injection control apparatus of an internal combustion engine according to claim 1, wherein the divided injection amount calculation portion obtains a heat production amount-insuring injection amount that is the necessary injection amount when executing the sub injection in order to prevent the heat production amount from decreasing to a threshold value or less in the initial injection period of main injection, and obtains a peak value suppression division ratio that is a division ratio of a divided injection amount relative to the total fuel injection amount required in order to suppress the peak value of the amount of heat production that accompanies combustion of fuel injected in main injection to less than a threshold value, and when the heat production amount-insuring injection amount is more than a peak value suppression injection amount obtained by multiplying the peak value suppression division ratio by the total fuel injection amount, the heat production amount-insuring injection amount is set as the divided injection amount, and when the peak value suppression injection amount is more than the heat production amount-insuring injection amount, the peak value suppression injection amount is set as the divided injection amount.

3. The fuel injection control apparatus of an internal combustion engine according to claim 2, wherein the peak value suppression division ratio is set to about 10%.

4. The fuel injection control apparatus of an internal combustion engine according to claim 1, wherein the upper/lower limit limiting portion sets the lower limit value of the divided injection amount to a minimum limit injection amount of a fuel injection valve.

5. The fuel injection control apparatus of an internal combustion engine according to claim 1, wherein the upper/lower limit limiting portion sets the upper limit value of the divided injection amount to an injection amount that minimizes ignition delay of fuel when executing the sub injection, or minimizes worsening of engine efficiency.

6. The fuel injection control apparatus of an internal combustion engine according to claim 1, wherein the sub injection timing setting portion, when the divided injection amount is at least twice the minimum limit injection amount of the fuel injection valve, executes the sub injection with multi-stage injection.

7. The fuel injection control apparatus of an internal combustion engine according to claim 1, further comprising:
   an increase correction portion that, when a target ignition timing of fuel injected in the main injection is set to an angle later than a position where a piston has reached a compression top dead center, performs correction to increase the divided injection amount injected in the sub injection.

* * * * *

UNITED STATES PATENT AND TRADEMARK OFFICE
CERTIFICATE OF CORRECTION

PATENT NO.        : 8,428,850 B2                                           Page 1 of 1
APPLICATION NO. : 12/746426
DATED             : April 23, 2013
INVENTOR(S)       : Nada et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 558 days.

Signed and Sealed this
Eighth Day of September, 2015

Michelle K. Lee
*Director of the United States Patent and Trademark Office*